United States Patent
Lecroq et al.

(10) Patent No.: US 8,960,619 B2
(45) Date of Patent: Feb. 24, 2015

(54) METHOD AND DEVICE FOR ASSEMBLING A MOTOR-FAN UNIT AND A RADIATOR FOR A MOTOR VEHICLE ENGINE AND MOTOR-FAN UNIT AND RADIATOR ASSEMBLY OBTAINED

(75) Inventors: Dominique Lecroq, Ivry la Bataille (FR); Patrick David, Maurepas (FR)

(73) Assignee: Renault s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/128,284

(22) PCT Filed: May 21, 2012

(86) PCT No.: PCT/FR2012/051121
§ 371 (c)(1),
(2), (4) Date: Jan. 15, 2014

(87) PCT Pub. No.: WO2012/175831
PCT Pub. Date: Dec. 27, 2012

(65) Prior Publication Data
US 2014/0138513 A1     May 22, 2014

(30) Foreign Application Priority Data
Jun. 20, 2011 (FR) ..................... 11 55362

(51) Int. Cl.
*F24H 9/06* (2006.01)
*B60K 11/04* (2006.01)
(Continued)

(52) U.S. Cl.
CPC ................. *B60K 11/04* (2013.01); *F28F 9/002* (2013.01); *F04D 19/002* (2013.01);
(Continued)

(58) Field of Classification Search
USPC ................... 248/639, 675, 201, 213.3, 213.4, 248/223.31, 232; 165/67, 41, 51; 180/684
See application file for complete search history.

(56) References Cited

U.S. PATENT DOCUMENTS 5,219,016 A * 6/1993 Bolton et al. ................. 165/41
6,155,335 A   12/2000 Acre et al.
(Continued)

FOREIGN PATENT DOCUMENTS

| | | |
|---|---|---|
| DE | 10 2006 060 085 | 6/2007 |
| EP | 1 048 505 | 11/2000 |
| FR | 2 922 823 | 5/2009 |

OTHER PUBLICATIONS

French Search Report Issued Mar. 9, 2012 in Application No. FR 1155362 Filed Jun. 20, 2011.
International Search Report Issued Dec. 21, 2012 in PCT/FR12/051121 Filed May 21, 2012.

*Primary Examiner* — Bradley Duckworth
(74) *Attorney, Agent, or Firm* — Oblon, Spivak, McClelland, Maier & Neustadt, L.L.P.

(57) ABSTRACT

A device assembling a motor-fan with a motor vehicle engine radiator, including: a first support frame supporting the motor-fan and a second support frame supporting the radiator, at least one of the support frames including at least one peripheral sealing baffle to overlap a peripheral edge of the other support frame; at least four fixing points fixing the motor-fan to the radiator by engaging together simultaneously, including two upper fixing points each including at least one pin and a U-shaped lug to hold the upper part of the motor-fan with relatively little play in relation to the radiator, and two lower fixing points each including at least one pin and a lug with an L-shaped housing to hold the lower part of the motor-fan slightly away from the radiator and at an end of travel bring the lower part of the motor-fan close to the radiator with relatively little play.

9 Claims, 2 Drawing Sheets

(51) Int. Cl.
*F28F 9/00* (2006.01)
*F04D 19/00* (2006.01)
*F04D 29/08* (2006.01)
*F04D 29/60* (2006.01)
*B60K 11/06* (2006.01)
*F28D 21/00* (2006.01)

(52) U.S. Cl.
CPC .......... *F04D 29/083* (2013.01); *F04D 29/601* (2013.01); *B60K 11/06* (2013.01); *F28D 2021/0094* (2013.01); *F28F 2275/14* (2013.01)
USPC .......... 248/232; 248/213.3; 165/51; 180/68.4

(56) References Cited

U.S. PATENT DOCUMENTS

| | | | |
|---|---|---|---|
| 6,772,982 B2 * | 8/2004 | Nakagawa et al. | 248/232 |
| 7,703,730 B2 * | 4/2010 | Best et al. | 248/220.22 |
| 8,312,951 B2 * | 11/2012 | Bui et al. | 180/68.4 |
| 2001/0013405 A1 * | 8/2001 | Mangold | 165/67 |
| 2003/0062456 A1 | 4/2003 | Nakagawa et al. | |
| 2011/0284301 A1 | 11/2011 | Bui et al. | |
| 2012/0024494 A1 * | 2/2012 | Grasso et al. | 165/51 |

* cited by examiner

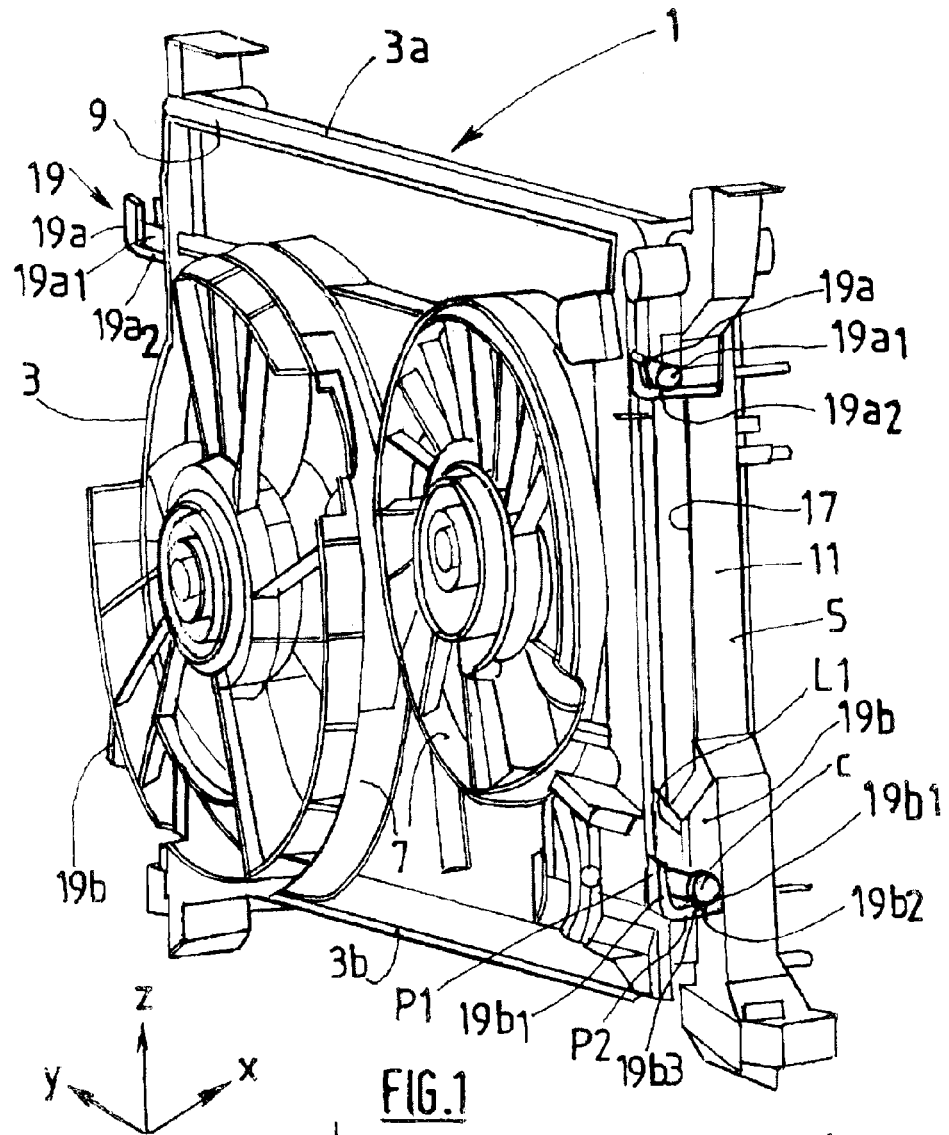
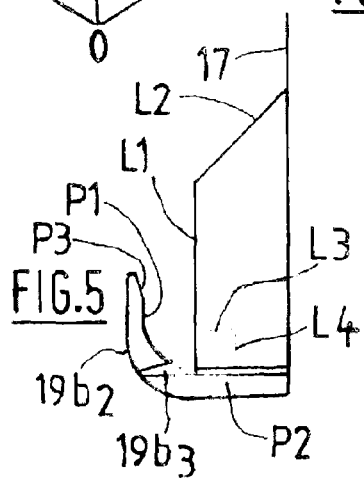
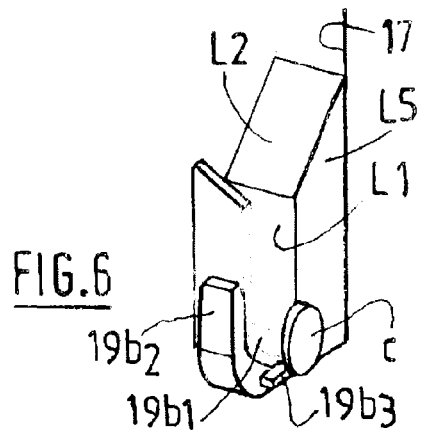

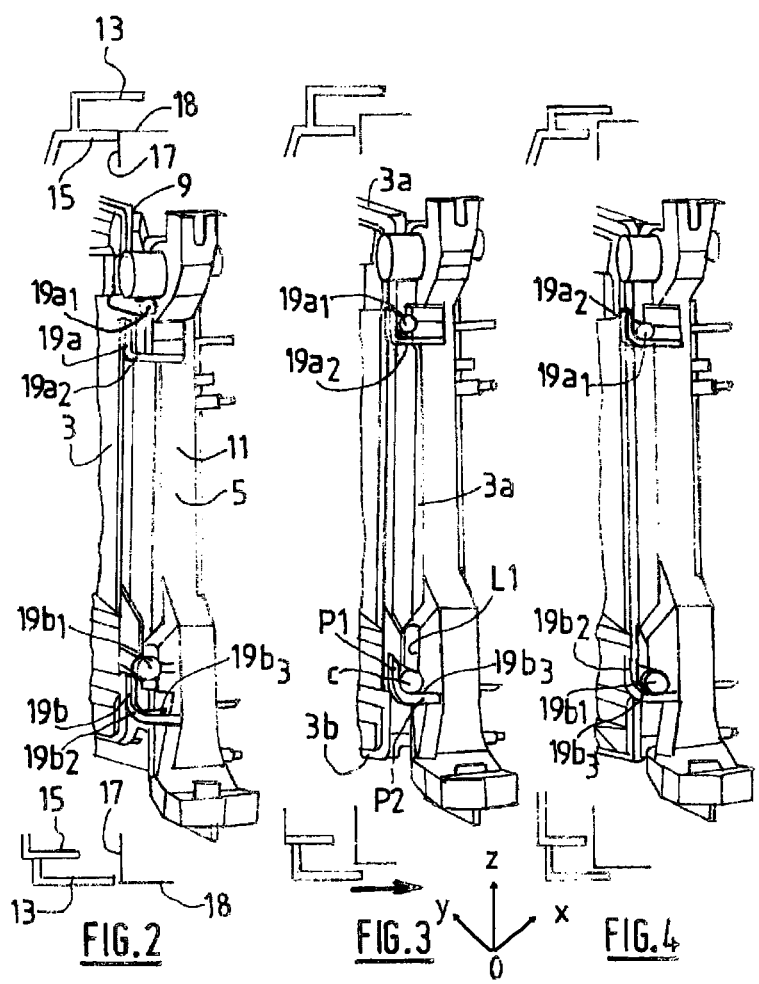

METHOD AND DEVICE FOR ASSEMBLING A MOTOR-FAN UNIT AND A RADIATOR FOR A MOTOR VEHICLE ENGINE AND MOTOR-FAN UNIT AND RADIATOR ASSEMBLY OBTAINED

The invention concerns a method and a device for assembling a motor-fan unit and a radiator for a motor vehicle engine, and the motor-fan unit and radiator assembly obtained.

It is known that the space for mounting and removing a motor-fan unit on a radiator of a motor vehicle is reduced to a narrow vertical space in front of the engine, in particular because of the compactness of modern engines and vehicles.

Furthermore it is known that the peripheral mounting clearance between the motor-fan unit and the radiator causes a lateral air leak via said clearance, which reduces the ventilation efficiency of the motor-fan unit.

In practice an assembly of a motor-fan unit and a radiator for an engine is known which is obtained by vertical translation on slides and fixing by clipping the motor-fan unit to the radiator. This arrangement does not allow a tight play in the assembly of the motor-fan unit and radiator, in particular when the elements are of the type with a sealing baffle overlapping the assembly edge.

Also an assembly of a motor-fan unit and a radiator of the baffle type described above is known which is obtained by horizontal translation and screw fixing of the motor-fan unit to the radiator. This assembly requires a larger clearance for mounting and removing the motor-fan unit on the radiator than the type described above, in particular for accessibility to the fixing screws. Furthermore the mounting time (screwing) and the means used (screw, support brace, screw fittings) are also greater.

There is therefore a need for a method and a device for assembling a motor-fan unit and a radiator for a motor vehicle engine, which allows mounting and removal of the motor-fan unit on the radiator in a restricted clearance space in the vehicle, and which allows assembly with little baffle play, in particular for a motor-fan unit and radiator with sealing baffles overlapping the edge.

A device is proposed for assembling a motor-fan unit to a radiator of a motor vehicle. This radiator can be associated with a cooling circuit intended for cooling the vehicle engine, or other vehicle cooling circuits.

The assembly device according to the invention is characterized in that it comprises:
  a first peripheral support frame intended to support the motor-fan unit and a second peripheral support frame intended to support the radiator, at least one of the support frames being fitted with at least one peripheral sealing baffle intended to overlap the lateral peripheral edge of the other support frame,
  at least two upper fixing points and two lower fixing points integral to each of said support frames, each fixing point comprising a pin and a lug defining a housing and arranged to cooperate by engaging together simultaneously, the pins of the fixing points being integral with one support frame and the corresponding lugs being integral with the other support frame, and wherein
each lug of an upper fixing point defines a U-shaped housing with the support frame with which it is integral, and the corresponding pin is shaped to slide in this U-shaped housing, the pins and lugs of the upper fixing points being positioned and arranged such that when the pins are inserted in the U-shaped housings, the upper parts of the support frames are held at a predefined distance from each other in a direction perpendicular to the plane of the support frames, and
each lug of a lower fixing point is L-shaped and defines an L-shaped housing with the support frame with which it is integral, the opening of this housing being located at one end of the main branch of the L-shaped lug, and the base of the housing being located at the other end of the lug integral with the support frame, and the corresponding pin is shaped to slide in this L-shaped housing, the pins and lugs of the lower fixing points being positioned and arranged such that when the pins are inserted in the main branch of the L-shaped housing, the lower parts of the support frames are held spaced apart, and when the pins are inserted to the base of the lower branch of the L-shaped housing, the lower parts of the support frames are held at a predefined distance from each other in a direction perpendicular to the plane of the support frames,
  at least one lateral indexing element able to position the support frames in relation to each other in a direction parallel to the plane of the support frames and perpendicular to the sliding direction of the pins in the U-shaped housings, and
  at least one element for locking the assembly of support frames in relation to each other.

The assembly device according to the invention thus allows positioning of the support frames at a predefined distance in relation to each other, such that little play, for example 1 to 3 mm, can be obtained between the support frames over their entire periphery, guaranteeing a mounting clearance and optimizing the seal and the ventilation efficiency. This precise positioning can be obtained without damage despite the presence of one or more baffles on the periphery of the frame or frames.

The upper and lower parts of the frames are preferably held at a same predefined distance from each other after assembly for better ventilation efficiency, although different distances are also possible.

The support frames are preferably shaped such that the motor-fan unit and radiator are each enshrined dimensionally in their respective support frame.

Advantageously the support frames form an integral part of the motor-fan unit and radiator respectively.

One of the support frames, for example the frame of the motor-fan unit, can comprise two peripheral baffles, a long outer baffle intended to overlap a corresponding lateral peripheral edge of the other support frame, for example the radiator support frame, and an inner baffle set back in relation to the outer baffle and intended to be positioned facing the corresponding front peripheral edge of the other support frame, at a predefined distance from said front peripheral edge.

These baffles are intended to form a barrier with a double peripheral seal between the frames and hence between the motor-fan unit and the radiator. Their positioning at a predefined distance and in particular with little play (for example 1 to 3 mm) allows an improvement in the ventilation efficiency.

The lateral indexing element of the support frames can comprise a simple heel integral with an element of a fixing point and able to be applied laterally against the complementary surface of the other element of said fixing point.

Advantageously the element for locking the assembly of the support frames comprises an element of a lower fixing point which is movable between a locked position, in which it blocks the movement of a pin at the base of the lower branch of the corresponding L-shaped housing, and an unlocked position allowing the movement of said pin out of said lower branch of the L-shaped housing.

Such an element can easily be manipulated for locking or unlocking of the support frames.

In particular, the movement from the unlocked position to the locked position can be caused by the sliding of the lower fixing pin inside the L-shaped housing. The assembly of the support frames, and in particular the motor-fan unit support frame and the radiator support frame, and then the assembly of the motor-fan unit and radiator, now requires no tools and the motor-fan unit can be locked in position relative to the radiator very quickly.

Advantageously, the main branch of the L-shaped housing can be defined firstly by the main branch of the L-shaped lug and secondly by an inner surface of the support frame with which said lug is integral, facing the main branch thereof. This inner surface is shaped to keep the lower part of the support frame carrying the pins spaced, by a predefined distance, from the lower part of the other support frame, when the pins of the lower fixing point are each inserted in the main branch of the L-shaped housing, applied against this inner surface.

This allows assembly of the motor-fan unit with a sealing baffle on a radiator in a minimum space in front of the radiator, and control of the play on each side of the assembly without risk of damage.

The support frames of the motor-fan unit and radiator being mounted on the motor-fan unit and radiator respectively, the method for implementing the assembly device comprises the following phases:

pre-positioning of the one or the first of the support frames in relation to the other support frame by arranging it such that the pins are facing the opening of the U-shaped and L-shaped housings defined by the corresponding lugs, the support frames being indexed laterally in relation to each other, movement of the first support frame downward relative to the other support frame, the pins of the fixing points sliding down respectively inside each of the U-shaped and L-shaped housings, as far as the base of the U-shaped housing, pushing the lower part of the first support frame towards the other support frame in order to move each of the pins of the lower fixing point to the base of the lower branch of the corresponding L-shaped housing, and locking the engagement of each of the pins of the lower fixing points at the base of the lower branch of the L-shaped housing.

When one of the support frames, for example the support frame of the motor-fan unit, comprises two peripheral baffles, a long outer baffle intended to overlap a corresponding lateral peripheral edge of the other support frame, and an inner baffle set back relative to the outer baffle and intended to be positioned facing a corresponding front peripheral edge of said other support frame (for example of the radiator), in this case, for assembly of the motor-fan unit and radiator, the following steps are performed:

a pre-positioning of the assembly of the support frame comprising the baffles relative to the other support frame, wherein the pins are facing the opening of the U-shaped and L-shaped housings defined by the corresponding lugs, the support frames being indexed laterally in relation to each other, and wherein the outer baffle is above the upper part of the lateral peripheral edge of the other support frame, and the inner baffle of the support frame is positioned facing the upper part of the front peripheral edge of the other support frame, at a predefined distance from said front peripheral edge, a downward movement of the support frame comprising the baffles relative to the other support frame, each of the pins of the fixing points sliding down inside the corresponding U-shaped and L-shaped housings, as far as the base of the U-shaped housing, wherein the outer baffle of the support frame overlaps the upper part of the lateral peripheral edge of the other support frame, the movement of the lower part of the support frame comprising the baffles towards the other support frame, the pins of each of the lower fixing points sliding in a lower branch of the L-shaped housing until they reach the base of this housing, the outer baffle then overlapping the lower part of the lateral peripheral edge of the other support frame, and locking the support frame comprising the baffles in position relative to the other support frame.

An embodiment of the invention is now described as an example with reference to the attached drawings in which:

FIG. 1 is a perspective view of an assembly of a motor-fan unit and a radiator of a motor vehicle engine, assembled according to the embodiment described, FIGS. 2 to 4 show various phases of the method of implementing the assembly device for the motor-fan unit to the radiator according to the embodiment described, and FIGS. 5 and 6 respectively are a front view without fixing pin and a perspective view with fixing pin of the fixing point for lateral indexing of the assembly of the support frames.

A coordinate system for axes X, Y and Z is shown in FIG. 1.

As shown in FIG. 1, a cooling assembly 1 comprises a motor-fan unit 3 and a radiator 5 of the cooling circuit of a motor vehicle, connected together.

This assembly 1 is intended to be mounted compactly, for example in the front engine compartment of the vehicle. In such a compartment, generally arranged at the front of the engine (not shown), the space provided for mounting the motor-fan unit 3 on the radiator 5 is reduced.

The motor-fan unit 3 in the present case comprises two fans 7 arranged adjacent to each other in the same plane, these fans being intended to blow air towards the radiator 5 in order to cool the cooling liquid circulating therein.

The motor-fan unit 3 is arranged facing the radiator 5.

It comprises a rectangular peripheral support frame 9, and similarly the radiator 5 comprises a complementary rectangular peripheral support frame 11.

In the present application, the terms "support frame" or "frame" also designate a "peripheral support frame". The frames also define planes parallel to plane YZ of the coordinate system of the figures.

The support frames 9, 11 of the motor-fan unit 3 and radiator 5 are generally mounted on the motor-fan unit 3 and radiator 5 respectively, before being assembled by means of the device according to the invention.

The support frames 9, 11 are preferably shaped such that the motor-fan unit 3 and the radiator 5 are each enshrined dimensionally in their support frames after being mounted on the respective support frame. In other words, the motor-fan unit 3 and radiator 5 do not protrude from their frame 9, 11 after mounting thereon.

The support frames 9, 11 are for example rectangular.

These support frames 9, 11 can also be molded from plastic material, for example of the polypropylene or polyamide type.

The support frame 9 of the motor-fan unit 3 comprises two parallel baffles directed towards the radiator 5 (FIGS. 2, 3 and 4). A long outer baffle 13 is intended to overlap the lateral peripheral edge 18 of the support frame 11 of the radiator 5, and a short inner baffle 15 is intended to face the front peripheral edge 17 of the support frame 11 of the radiator 5, perpendicular to this edge 17 (FIG. 2).

The lateral peripheral edge 18 of the support frame 11 overlapped by the outer baffle 13 extends perpendicular to the front peripheral edge 17 of the support frame 11. This front peripheral frame 17 is parallel to plane YZ of the coordinate system of the figures, parallel to the plane formed by the support frame 11.

A baffle is a device which blocks the flow of a moving fluid, for example support frame elements which induce a zigzag passage of the pulsed fluid, laterally between the two support frames. These elements generally extend over the entire periphery of the support frames.

The outer baffle 13 and inner baffle 15 are for example walls extending generally parallel to each other, as shown in the figures. More complex shapes (not shown) are however also conceivable.

When the support frames 9, 11 are assembled together, the outer baffle 13 overlaps or encases the lateral peripheral edge 18 of the support frame 11 which extends parallel to the baffles, whereas the inner baffle 15 is situated facing the front peripheral edge 17 of the support frame 11 at a predefined distance from this front peripheral edge 17 (in a direction perpendicular to the plane of the support frame carrying the baffles). The inner baffle 15 thus has a shorter dimension than the outer baffle 13 in direction X, such that the inner baffle is set back relative to the outer baffle (in a direction perpendicular to the plane of the support frame carrying the baffles).

The support frames 9, 11 of the motor-fan unit 3 and radiator 5 respectively are also each fitted with elements of fixing points 19 of the motor-fan unit 3 to the radiator 5:

two upper fixing points 19a each arranged substantially at an upper corner of each of the two support frames 9, 11 and generally identical, and two lower fixing points 19b each arranged substantially at a lower corner of each of the support frames 9, 11 and generally identical.

These elements 19a, 19b are arranged to cooperate in pairs, by engaging together simultaneously.

In the mounting position of the support frames 9, 11 in relation to each other:

the two upper fixing points 19a can be at the same height (on a same horizontal line parallel to axis Y), and similarly, the two lower fixing points 19b can be at the same height (parallel to axis Y), and/or one upper fixing point 19a and one lower fixing point 19b on the same lateral side of the support frames 9, 11 can be arranged on a same vertical line (parallel to axis Z).

In the example, the elements of the two upper fixing points 19a are identical and each comprise:

a pin 19a1 integral with the support frame 9 of the motor-fan unit 3, and a lug 19a2 integral with the support frame 11 of the radiator 5, this lug 19a2 delimiting (together with the support frame 11) a U-shaped housing, the cross section of which has a shape complementary to the cross-section of pin 19a1.

Each pin 19a1 is shaped to slide in this U-shaped housing.

More particularly, the pin 19a1 extends parallel to axis Y (parallel to the plane of the support frame 9), and the lug 19a2 extends parallel to plane XZ (perpendicular to the plane of the support frame 11), such that each pin 19a1 slides in its corresponding U-shaped housing following a slide direction parallel to axis Z.

The cross section of the pins 19a1 of the fixing points is dimensioned to correspond to the passage spacing of the U-shaped housing defined between the lugs 19a2 of the fixing points and the support frame 11, in order to guide the sliding of the pins in these housings perfectly.

These elements 19a1, 19a2 are configured to cooperate with each other on assembly so that the upper part 3a of the motor-fan unit 3 is arranged at a predefined distance relative to the radiator 5, namely along axis X perpendicular to the plane of the assembled support frames 9, 11. This distance can be of the order of a few millimeters, for example of the order of 1 to 3 mm, so as to maintain a tight play between the support frames 9, 11.

The two lower fixing points 19b, also identical, each comprise:

a pin 19b1 integral with the support frame 9 of the motor-fan unit 3, and an L-shaped lug 19b2 integral with the support frame 11 of the radiator 5 and delimiting, together with the support frame 11, an L-shaped housing (FIG. 5). This L-shaped housing has a cross section of shape complementary to the cross section of the pin 19b1.

Each pin 19b1 is shaped to slide in this L-shaped housing.

More particularly, the pin 19b1 extends parallel to direction Y, and the L-shaped lug 19b2 comprises a main branch P1 extending in direction Z, and a lower branch P2 integral with the support frame 11 and extending in direction X.

The L-shaped housing therefore comprises:

a main branch delimited by the main branch P1 of the lug 19b2 and an inner surface L1 of the support frame 11 facing this branch P1, a lower branch delimited by the lower branch P2 of the lug 19b2, by a surface L3 of the support frame 11 facing this branch P2, and by a surface L4 of the support frame 11 adjacent to branch P2 and surface L3.

Thus each pin 19b1 slides in the main branch of its corresponding L-shaped housing following a slide direction parallel to axis Z, and in the lower branch of its L-shaped housing following the slide direction parallel to axis X.

In general, the "main branch" of an L is the longest branch, and the "lower branch" of the L is its shorter branch.

The L-shaped housing is defined, on the side of the support frame 11 of the radiator 5, by the inner surface L1 arranged facing the main branch P1 of the lug 19b2, parallel to this main branch P1 of the lug 19b2, in plane YZ.

On the side of its upper end, the inner surface L1 is connected to the lower part of the support frame 11 by an oblique ramp L2 which can serve as guidance for the pin 19b1.

On the side of its lower end, the inner surface L1 forms a recessed shoulder comprising surface L3, which extends parallel to the lower branch P2 of the lug 19b2, and surface L4 parallel to the surface L1 and forming the base of the lower branch of the L-shaped housing delimited by the lug 19b2.

The inner surface L1 is remote from the front peripheral edge 17 of the support frame 11, for example by around 14 to 15 mm. This distance is selected such that when the pins 19b1 each slide in the main branch of their L-shaped housing, the lower parts of the support frames 9, 11 are sufficiently spaced apart not to touch each other.

The opening of the L-shaped housing is thus situated at one end of the main branch P1 of the lug 19b2, and the base of this housing is situated at the other end of the lug 19b2 which is integral with the support frame 11.

The openings of the two U-shaped and L-shaped housings are directed in the same direction, namely towards the upper edge of the frames along axis Z.

These elements 19b1, 19b2 are configured to cooperate with each other on assembly in order to space the lower part 3b of the motor-fan unit 3 relative to the radiator 5, when the pin 19b1 is inserted inside the main branch of the L-shaped housing (between part P1 of the lug 19b2 and the inner surface L1 of the frame 11, against these), and to bring the lower part 3b of the motor-fan unit 3 back to a predefined distance (for example 1 to 3 mm) relative to the radiator 5 in direction X when the pin 19b1 is pushed to the base of the lower branch of the L-shaped housing, against surface L4.

A locking clip 19b3 is arranged on the lower branch P2 of the lug 19b2 in order to block the pin 19b1 at the base of the lower branch of the L-shaped housing, against surface L4 (FIGS. 5 and 6). This clip 19b3, in the example shown, is an elastic tongue which retracts on passage of the pin 19b1 and returns against this to lock the pin in position at the base of the branch as soon as it has passed over the tongue.

One of the lower pins 19b1, for example the right-hand pin 19b1 (on the right-hand part of FIG. 1 and FIG. 6), of the motor-fan unit 3 comprises at its end a lateral guide heel c in the form of a disc, intended to slide laterally along the edge of the surface L1, resting against surface L5. This sliding is lateral because of a contact in direction Y between the heel c and surface L5. This surface L5 extends perpendicular to surface L1 and connects it to support frame 11. The heel c is intended to maintain the lateral positioning indexing (along axis Y) of the support frames in relation to each other.

The lateral indexing of one support frame in relation to the other means that the support frames are positioned in relation to each other in a direction parallel to the plane defined by the support frames and parallel to their lower or upper edges (along axis Y).

Such a lateral indexing can be provided on the two lower pins, and/or on at least one of the upper pins.

As a variant or in combination, this lateral indexing can consist of a system of grooves and corresponding vertical ribs produced on at least one of the fixing points.

Advantageously, the upper edge of each of the lugs of the fixing points 19 is flared towards the outside in order to facilitate introduction of the pins 19a1, 19b1 inside the housings defined by the lugs 19a2, 19b2. This flared upper edge is designated P3 in FIG. 5.

The assembly process is now described.

The radiator 5 being previously fixed to the vehicle engine in the engine compartment thereof, the following successive steps are carried out.

First an assembly pre-positioning is performed of the motor-fan unit 3 to the radiator 5, pins 19a1, 19b1 being positioned above lugs 19a2, 19b2 ready to be engaged in the openings of the U-shaped and L-shaped housings (FIG. 2).

The upper edge P3 flared towards the outside (visible in FIG. 5) of each of the lugs 19a2, 19b2 facilitates the introduction of the pins 19a1, 19b1 in the U-shaped and L-shaped housings between the lugs 19a2, 19b2 and the support frame 11.

The lateral guide heel c is applied against the edge of surface L1, resting against surface L5, which ensures the positioning indexing in direction Y.

The upper edge of the outer baffle 13 is then arranged above the lateral peripheral edge 18 of the support frame 11 of the radiator 5, and the upper part of the inner baffle 15 of the motor-fan unit 3 is applied close to the upper part of the front peripheral edge 17 of the support frame 11 of the radiator 5, facing this.

A downward movement (in direction Z) of the motor-fan unit 3 relative to the radiator 5 is then carried out (FIG. 3), the lateral guide heel c now being held sliding against surface L5.

Each of the pins 19a1, 19b1 slides down in the corresponding U-shaped and L-shaped housings, until reaching the base of the U-shaped housing for the pins 19a1 or stopping against the lower branch P2 of the lugs 19b2 for the pins 19b1.

It is thus preferable for the lugs 19a2 of the upper fixing points and the lugs 19b2 of the lower fixing points to be configured such that the slide length of the pins 19a2 along the main branch P1 of the lugs 19b2, as far as the lower branch P2 of these lugs 19b2, is identical to the slide length of the pins 19a1 as far as the base of the U-shaped housing defined by the lugs 19a2.

During this downward movement:
the upper part 3a of the motor-fan unit is guided relative to the radiator 5 in direction X perpendicular to the plane of the support frame 11 of the radiator 5. Because of this guiding in direction X, a tight play can now be maintained between the radiator 5 and the motor-fan unit 3, for example 1 to 3 mm from the radiator 5,
the lower part 3b is held spaced from the radiator 5 because of the distancing between the surface L1 and the front peripheral edge 17 of the support frame 11 of the radiator 5. The lower part of the outer baffle 13 of the motor-fan unit 3 is then held, during this movement, at a distance from the radiator 5, with no risk of touching and damaging it (risk of leak from radiator).

In general, the lower parts of the support frames 9 and 11 are held spaced by a predefined distance, sufficient for the baffle(s) of one support frame not to touch and not to damage the other support frame or the element integral with the other support frame. This distance can for example be 12 to 15 mm, preferably 12 mm.

For example the lugs 19a2 of the upper fixing points can be fixed to the front peripheral edge 17 of the support frame 11 (this peripheral edge 17 then defining the U-shaped housing with its lugs), and the inner surfaces L1 of the lower fixing points can be spaced from this front peripheral edge 17 by the predefined distance defining the spacing of the lower parts of the support frames 9 and 11.

At the end of the downward movement travel (in direction Z), the upper part of the outer baffle 13 comes to encase the lateral peripheral edge 18 of the support frame 11 of the radiator 5, while the upper part of the inner baffle 15 has little play (for example 1 to 3 mm) from the front peripheral edge 17 of the support frame of the radiator 5 (in direction X).

During the downward movement, the lower part of the outer baffle 13 is displaced in relation to the lower part of the front peripheral edge 17 of the frame of radiator 5, and then encases the lower part of the peripheral edge 18 of the frame 11 of the radiator 5 at the end of its downward movement.

Now the lower part 3b of the motor-fan unit 3 can be subjected, by pressing, to a transverse movement in direction X towards the radiator 5, wherein the pins 19b1 of each of the lower fixing points slide on the lower branch P2 of the lugs 19b2 and come to rest against surface L4 at the end of travel (FIG. 4). The elastic tongue of clip 19b3 retracts on passage of the pin 19b1 and returns against this to lock the pin in position in the X direction, at the base of the lower branch of the L-shaped housing. The lower part of the outer baffle 13 then overlaps the lower part of the lateral peripheral edge 18 of the support frame 11 of radiator 5, and the same applies over the entire periphery of the lateral peripheral edge 18 of the support frame 11 of radiator 5. The inner baffle 15 is then positioned with little play in direction X (for example 1 to 3 mm), facing the front peripheral edge 17 of the support frame 11 of radiator 5.

Dismantling takes place in the reverse manner to assembly described above. It is sufficient to unlock the clips 19b3 by pressing on the tongues, then to slide the pins 19a1, 19b1 in their housings, lifting the motor-fan unit 3 along the radiator 5 while its lower part 3b remains spaced, in the reverse manner to its downward movement. When the pins reach the upper edge of the lugs, the motor-fan unit 3 can be extracted from the radiator 5.

The device according to the invention thus allows assembly of a motor-fan unit with a sealing baffle to a radiator in the minimum space in front of the radiator, without risk of damaging the latter.

In general, the support frame comprising the baffles is the one comprising the fixing pins.

In the example described above, the support frame comprising the baffles is the support frame of the motor-fan unit 3.

Although generally not used, sealing baffles could be provided on the radiator frame in order to encase the motor-fan unit.

It is also possible for the pins of the fixing points to be integral with the radiator (or its support frame) and for the lugs to form part of the motor-fan unit, these lugs then having to be turned through a half-turn to have their opening at the bottom.

The invention claimed is:

1. A device for assembling a motor-fan unit to a radiator of a motor vehicle, the assembly device comprising:
    a first peripheral support frame configured to support the motor-fan unit and a second peripheral support frame configured to support the radiator, at least one of the support frames including at least one peripheral sealing baffle configured to overlap a lateral peripheral edge of the other support frame;
    at least two upper fixing points and at least two lower fixing points integral to each of the support frames, each fixing point comprising a pin and a lug defining a housing and configured to cooperate by engaging together simultaneously, the pins of the fixing points being integral with one support frame and the corresponding lugs being integral with the other support frame, and wherein each lug of an upper fixing point defines a U-shaped housing with the support frame with which it is integral, and the corresponding pin is shaped to slide in the U-shaped housing, the pins and lugs of the upper fixing points being positioned and arranged such that when the pins are inserted in the U-shaped housings, the upper parts of the support frames are held at a predefined distance from each other in a direction perpendicular to the plane of the support frames; and
    each lug of a lower fixing point is L-shaped and defines an L-shaped housing with the support frame with which it is integral, an opening of the housing being located at one end of the main branch of the L-shaped lug and the base of the housing being located at the other end of the lug integral with the support frame, and the corresponding pin is shaped to slide in the L-shaped housing, the pins and lugs of the lower fixing points being positioned and arranged such that when the pins are inserted in the main branch of the L-shaped housing, the lower parts of the support frames are held spaced apart, and when the pins are inserted into the base of the lower branch of the L-shaped housing, the lower parts of the support frames are held at a predefined distance from each other in a direction perpendicular to the plane of the support frames;
    at least one lateral indexing element configured to position the support frames in relation to each other in a direction parallel to the plane of the support frames and perpendicular to a sliding direction of the pins in the U-shaped housings; and
    at least one element for locking an assembly of the support frames in relation to each other.

2. The assembly device as claimed in claim 1, wherein the support frames are shaped such that the motor-fan unit and the radiator are each enshrined dimensionally in their respective support frame.

3. The assembly device as claimed in claim 1, wherein the support frames form an integral part of the motor-fan unit and radiator respectively.

4. The assembly device as claimed in claim 1, wherein one of the support frames comprises two peripheral baffles, a long outer baffle configured to overlap a corresponding lateral peripheral edge of the other support frame, and an inner baffle set back in relation to the outer baffle and configured to be positioned facing a corresponding front peripheral edge of the other support frame, at a predefined distance from the front peripheral edge.

5. The assembly device as claimed in claim 1, wherein the lateral indexing element comprises a heel integral with an element of a fixing point and configured to be applied laterally against a complementary surface of the other element of the fixing point.

6. The assembly device as claimed in claim 1, wherein the element for locking the assembly of the support frames comprises an element of a lower fixing point which is movable between a locked position, in which it blocks movement of a pin at the base of the lower branch of the corresponding L-shaped housing, and an unlocked position allowing the movement of the pin out of the lower branch of the L-shaped housing.

7. The assembly device as claimed in claim 1, wherein the main branch of the L-shaped housing is defined by the main branch of the L-shaped lug and by an inner surface of the support frame with which the lug is integral, facing the main branch thereof, the inner surface being shaped to keep the lower part of the support frame carrying the pins spaced, by a predefined distance, from the lower part of the other support frame when the pins of the lower fixing point are each inserted in the main branch of the L-shaped housing, applied against the inner surface.

8. A method for implementing the assembly device as claimed in claim 1, the method comprising:
    pre-positioning the one or the first of the support frames in relation to the other support frame by arranging it such that the pins are facing the opening of the U-shaped and L-shaped housings defined by the corresponding lugs, the support frames being indexed laterally in relation to each other;
    moving the first support frame downward relative to the other support frame, the pins of the fixing points sliding down respectively inside each of the U-shaped and L-shaped housings, as far as the base of the U-shaped housing;
    pushing the lower part of the first support frame towards the other support frame to move each of the pins of the lower fixing point to the base of the lower branch of the corresponding L-shaped housing; and
    locking the engagement of each of the pins of the lower fixing points at the base of the lower branch of the L-shaped housing.

9. The method as claimed in claim 8, wherein one of the support frames comprises two peripheral baffles, a long outer baffle configured to overlap a corresponding lateral peripheral edge of the other support frame, and an inner baffle set back relative to the outer baffle and configured to be positioned facing a corresponding front peripheral edge of the other support frame, the method further comprising:
- pre-positioning the assembly of the support frame comprising the baffles relative to the other support frame, wherein the pins are facing the opening of the U-shaped and L- shaped housings defined by the corresponding lugs, the support frames being indexed laterally in relation to each other, and wherein the outer baffle is above the upper part of the lateral peripheral edge of the other support frame, and the inner baffle of the support frame is positioned facing the upper part of the front peripheral edge of the other support frame, at a predefined distance from the front peripheral edge;
- a downward moving of the support frame comprising the baffles relative to the other support frame, each of the pins of the fixing points sliding down inside the corresponding U-shaped and L-shaped housings, as far as the base of the U-shaped housing, wherein the outer baffle of the support frame overlaps the upper part of the lateral peripheral edge of the other support frame;
- moving the lower part of the support frame comprising the baffles towards the other support frame, the pins of each of the lower fixing points sliding in a lower branch of the L-shaped housing until they reach the base of this housing, the outer baffle then overlapping the lower part of the lateral peripheral edge of the other support frame; and
- locking the support frame comprising the baffles in position relative to the other support frame.

* * * * *